United States Patent
Poulin et al.

(10) Patent No.: US 11,319,836 B2
(45) Date of Patent: May 3, 2022

(54) LUBRICANT DRAIN CONDUIT FOR GAS TURBINE ENGINE

(71) Applicant: PRATT & WHITNEY CANADA CORP., Longueuil (CA)

(72) Inventors: Martin Poulin, Mont Saint-Hilaire (CA); Sean Powers, Candiac (CA)

(73) Assignee: PRATT & WHITNEY CANADA CORP., Longueuil (CA)

(*) Notice: Subject to any disclaimer, the term of this patent is extended or adjusted under 35 U.S.C. 154(b) by 266 days.

(21) Appl. No.: 16/540,667

(22) Filed: Aug. 14, 2019

(65) Prior Publication Data
US 2021/0047941 A1    Feb. 18, 2021

(51) Int. Cl.
*F01D 25/18* (2006.01)
*F16H 57/04* (2010.01)

(52) U.S. Cl.
CPC .......... *F01D 25/18* (2013.01); *F01D 25/183* (2013.01); *F16H 57/0408* (2013.01); *F05D 2260/98* (2013.01)

(58) Field of Classification Search
CPC ........ F01D 25/18; F01D 25/183; F01D 25/20; F01D 9/065; F01D 11/001; F01D 11/00; F16H 57/0408; F65D 2260/98; F02C 7/06
See application file for complete search history.

(56) References Cited

U.S. PATENT DOCUMENTS

| | | | | |
|---|---|---|---|---|
| 3,027,971 A | * | 4/1962 | Ketler, Jr. | F01D 25/18 184/6.13 |
| 3,312,448 A | * | 4/1967 | Huil, Jr. | F01D 9/065 415/175 |
| 3,618,710 A | * | 11/1971 | DeLisse | F01D 25/20 184/6.11 |
| 4,451,200 A | * | 5/1984 | Libertini | F01D 25/18 384/398 |
| 4,463,956 A | * | 8/1984 | Malott | F01D 25/18 277/412 |
| 4,497,172 A | * | 2/1985 | Smith | F01D 11/06 184/6.11 |
| 6,070,881 A | * | 6/2000 | Longree | F16J 15/40 277/409 |
| 6,102,577 A | * | 8/2000 | Tremaine | F01D 25/186 384/493 |
| 6,609,888 B1 | * | 8/2003 | Ingistov | F01D 11/005 415/113 |

(Continued)

*Primary Examiner* — Michael A Riegelman
(74) *Attorney, Agent, or Firm* — Norton Rose Fulbright Canada LLP

(57) ABSTRACT

An assembly for a gas turbine engine having: static and rotating components; a seal between the static and rotating components, and between a cavity and an environment outside thereof, the cavity having an inlet fluidly connectable to a source of lubricant and an outlet fluidly connectable to a scavenge pump for drawing lubricant out of the cavity; and a drain conduit having a drain inlet outside the cavity in proximity to the seal for receiving leaked lubricant, and a drain outlet fluidly connected to the outlet of the cavity, the drain outlet located in proximity to a scavenge inlet via which the lubricant exits the cavity to flow toward the scavenge pump such that, in use, a lubricant flow within the drain conduit is entrained by the lubricant exiting the cavity via the scavenge inlet.

18 Claims, 1 Drawing Sheet

(56) References Cited

U.S. PATENT DOCUMENTS

| | | | | |
|---|---|---|---|---|
| 7,568,843 | B2* | 8/2009 | Lefebvre | F01D 25/162 |
| | | | | 184/6.11 |
| 8,834,095 | B2* | 9/2014 | Davis | F16C 27/045 |
| | | | | 415/112 |
| 9,115,592 | B2* | 8/2015 | Gauthier | F16J 15/3288 |
| 10,100,672 | B2* | 10/2018 | Vdoviak, Jr | F01D 25/183 |
| 10,364,846 | B2* | 7/2019 | Clark | F16C 33/72 |
| 11,028,717 | B2* | 6/2021 | Amador | F01D 11/04 |
| 2008/0110699 | A1* | 5/2008 | Munson | F02C 7/06 |
| | | | | 184/6.11 |
| 2009/0243222 | A1* | 10/2009 | Pisseloup | F01D 11/001 |
| | | | | 277/422 |
| 2009/0302543 | A1* | 12/2009 | Ruggiero | F16J 15/002 |
| | | | | 277/303 |
| 2011/0198155 | A1* | 8/2011 | Charier | F02C 7/06 |
| | | | | 184/6.23 |
| 2012/0126484 | A1* | 5/2012 | Dos Santos | F16J 15/3288 |
| | | | | 277/355 |
| 2014/0174858 | A1* | 6/2014 | Remer | F01D 25/18 |
| | | | | 184/106 |
| 2014/0208759 | A1* | 7/2014 | Ekanayake | F02C 7/06 |
| | | | | 60/772 |
| 2016/0237899 | A1* | 8/2016 | Denman | F02C 7/06 |
| 2017/0067397 | A1* | 3/2017 | Fang | F16C 33/664 |
| 2017/0314468 | A1* | 11/2017 | Wotzak | F02C 3/04 |
| 2021/0047941 | A1* | 2/2021 | Poulin | F16H 57/0438 |
| 2021/0131321 | A1* | 5/2021 | Tomescu | F02C 7/06 |

\* cited by examiner

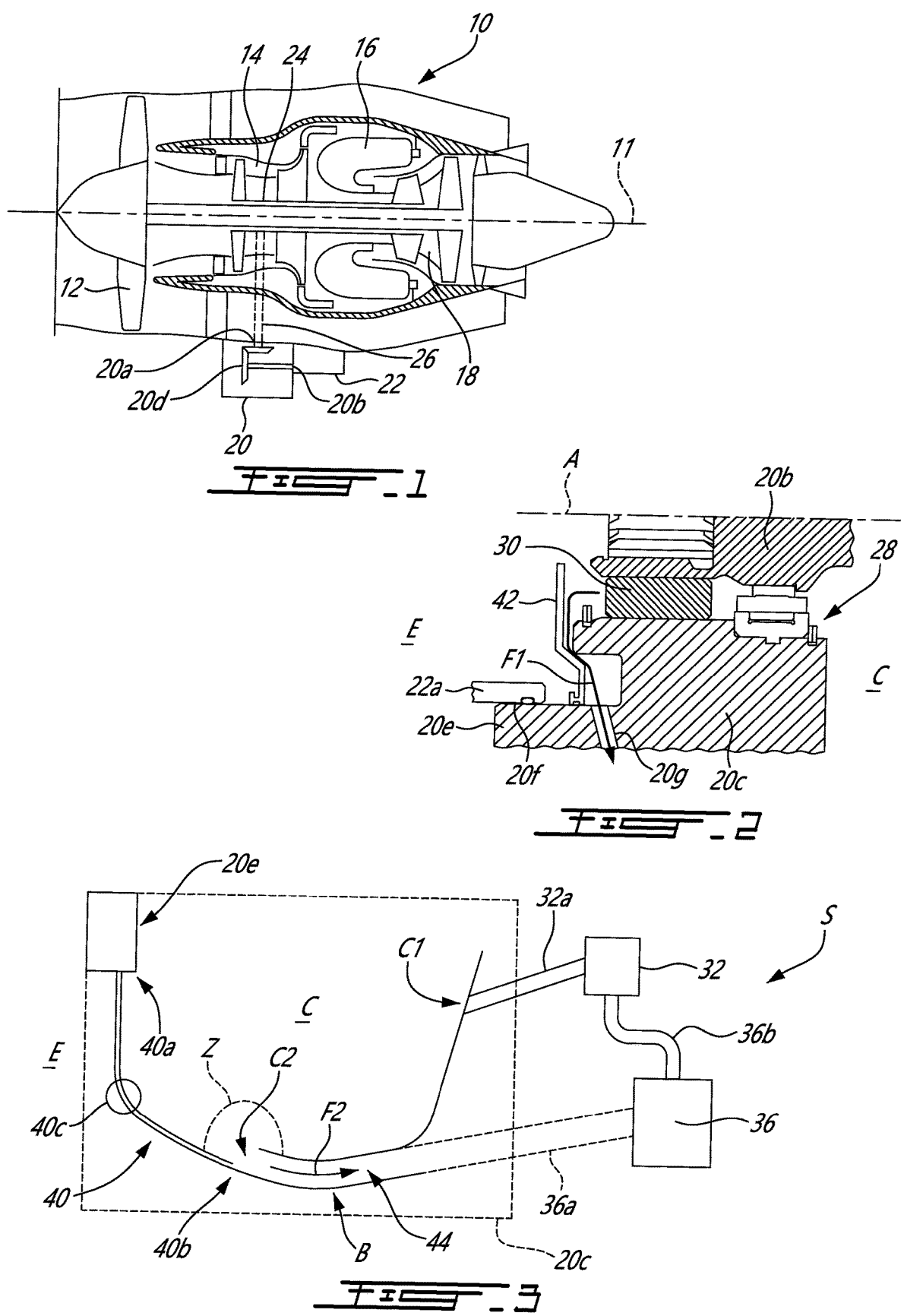

LUBRICANT DRAIN CONDUIT FOR GAS TURBINE ENGINE

TECHNICAL FIELD

The application relates generally to gas turbine engines and, more particularly, to lubrication of components in such engines.

BACKGROUND OF THE ART

A gas turbine engine includes a plurality of seals. Such seals may be used to limit lubricant from leaking out of a lubricated cavity, such as a bearing cavity. However, leaks might be unavoidable and, in some cases, leaking lubricant may be excessive, which is undesirable.

SUMMARY

In one aspect, there is provided an assembly for a gas turbine engine comprising: static and rotating components; a seal between the static and rotating components, and between a cavity and an environment outside thereof, the cavity having an inlet fluidly connectable to a source of lubricant and an outlet fluidly connectable to a scavenge pump for drawing lubricant out of the cavity; and a drain conduit having a drain inlet outside the cavity in proximity to the seal for receiving leaked lubricant, and a drain outlet fluidly connected to the outlet of the cavity, the drain outlet located in proximity to a scavenge inlet via which the lubricant exits the cavity to flow toward the scavenge pump such that, in use, a lubricant flow within the drain conduit is entrained by the lubricant exiting the cavity via the scavenge inlet.

In another aspect, there is provided a gearbox comprising a housing and an output shaft rotatable relative to the housing, the housing defining a cavity therein, a seal between the housing of the gearbox and the output shaft, and between the cavity and an environment outside the cavity, the cavity having an inlet fluidly connectable to a source of lubricant and an outlet fluidly connectable to a scavenge pump for drawing lubricant out of the cavity, a drain conduit having a drain inlet outside the cavity in proximity to the seal for receiving leaked lubricant, and a drain outlet fluidly connected to the outlet of the cavity, the drain outlet located in proximity to a scavenge inlet via which the lubricant exits the cavity to flow toward the scavenge pump, such that, in use, a lubricant flow within the drain conduit is entrained by the lubricant exiting the cavity via the scavenge inlet.

In yet another aspect, there is provided a method of scavenging lubricant comprising: maintaining a pressure differential between a cavity and an environment outside thereof with a seal; receiving in a drain conduit lubricant that leaks out of the cavity via the seal; and entraining the received leaked lubricant back into the cavity by suctioning lubricant out of the cavity.

DESCRIPTION OF THE DRAWINGS

Reference is now made to the accompanying figures in which:

FIG. 1 is a schematic cross-sectional view of a gas turbine engine;

FIG. 2 is a schematic cross-sectional view of a portion of a gearbox that can be used with the gas turbine engine of FIG. 1; and FIG. 3 is a schematic cross-sectional view of a portion of a cavity of the gearbox of FIG. 2.

DETAILED DESCRIPTION

FIG. 1 illustrates a gas turbine engine 10 of a type preferably provided for use in subsonic flight, generally comprising in serial flow communication a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases. The fan 12, the compressor section 14, and the turbine section 18 are rotatable about a central axis 11 of the engine 10.

Still referring to FIG. 1, the gas turbine engine 10 may include a gearbox 20 that may be in driving engagement with an accessory 22, such as a pump, a generator, or any suitable accessory. The gearbox 20 has an input 20a that may be in driving engagement with a shaft 24 of the gas turbine engine 10 via an accessory shaft 26. Though not shown for simplicity, a gear arrangement may be present between shafts 24 and 26, as one possibility among others (e.g., chain, belt, etc). The gearbox 20 includes an output 20b configured to drivingly engage an input of the accessory 22.

Referring now to FIGS. 2 and 3, an assembly that may be found in and/or may include the gearbox 20 is generally shown. The assembly includes the gearbox 20 having a housing 20c, also referred to as a static component, that is configured to contain gears 20d of the gearbox 20. The gears of the gearbox 20 are contained within a cavity C defined by the housing 20c of the gearbox 20. In the embodiment shown, the output 20b of the gearbox 20 is defined by an output shaft 20b, also referred to as a rotating component, of the gearbox 20. The output shaft 20b of the gearbox 20 is rotatable about an axis A relative to the housing 20c. A support, such as a bearing 28, is located radially between the output shaft 20b and the housing 20c relative to the rotation axis A of the output shaft 20b for rotatably supporting the output shaft 20b.

In the embodiment shown, the housing 20c of the gearbox 20 includes a pad 20e. The pad 20e may be a protrusion that extends relative to the rotation axis A, and away from a remainder of the housing 20c—for an example the pad 20e may extends partially or substantially axially. The pad 20e may extend circumferentially around the rotation axis A, though this may not be necessary. The pad 20e defines an abutment surface 20f that is configured to be in contact with a spigot 22a of the accessory 22. The spigot 22a of the accessory 22 and the pad 20e of the gearbox housing 20c cooperate to radially support the accessory 22 relative to the output shaft 20d of the gearbox 20 Alternatively, the accessory 22 and the gearbox 20 may be each independently supported to the engine 10 via, for instance, a casing of the engine. In some cases, the accessory may be supported by a bolted connection, a V-band, a quad pad adapter, or any other suitable means.

For lubrication of the gears of the gearbox 20, the cavity C of the gearbox 20 is fluidly connected to a source of lubricant 32. The source of lubricant 32 can be part of a lubricant distribution system S of the gas turbine engine 10, as may other components, such as conduits, a reservoir, jets. The source of lubricant 32 may be fluidly connected to the cavity C via a conduit 32a. A pressure inside the cavity C of the gearbox 20 may be greater than that in an environment E outside the gearbox 20. Consequently, lubricant might leak out of the cavity C of the gearbox 20. To limit leakage of lubricant, a seal(s) 30 is disposed radially between the housing 20c and the output shaft 20b of the gearbox 20. Any suitable type of seals may be used without departing from the scope of the present disclosure. For instance, the seal 30 may be a labyrinth seal, a carbon seal, a control gap seal or any other suitable type of seal, and may include one or more components such as a runner and seal set, etc. As shown in FIG. 2, the bearing 28 is located within the cavity C.

Still referring to FIGS. 2 and 3, the seal 30 might leak outside of the cavity C because of the pressure difference shown between the cavity C and the environment E. Leaks might occur due to seal malfunction and/or wear. When lubricant leaks, the leakage of lubricant might be visible, which is undesirable.

The cavity C has an inlet C1 fluidly connected to the source of lubricant 32 and an outlet C2 that is fluidly connected to a scavenge pump 36 of the lubrication system S. In the embodiment shown, the axis A is substantially parallel to a ground when an aircraft equipped with the engine 10 is at rest on the ground. The outlet C2 of the cavity C is located at a bottom B of the cavity C. In other words, a height of the outlet C2 of the cavity C relative to the ground is less than that of the inlet C1 of the cavity C and of that of the axis A. In the embodiment shown, a scavenge conduit 44 fluidly connects the outlet C2 of the cavity C to the scavenge pump 36. In the embodiment shown, the scavenge conduit 44 is connected to the scavenge pump 36 via a pump conduit 36a. As shown, the scavenge conduit 44 extends partially inside the bearing cavity C. Alternatively, the scavenge conduit 44 may extend from an aperture defined through the housing 20c, and defining the outlet C2 of the cavity C, to the scavenge pump 36.

In the embodiment shown, the scavenge pump 36 and the source of lubricant 32 are fluidly connected via a conduit 36b. In such a case, the lubricant that is scavenged from the cavity C may be redirected to the source of lubricant 32 to be injected back in the cavity C. In other words, the lubrication system S of the aircraft 10 may form a loop system in which the lubricant circulates form the source of lubricant 32 to the cavity C, from the cavity C to the scavenge pump 36, and from the scavenge pump 36 back to the source of lubricant 32 to be re-injected in the cavity C.

Referring more particularly to FIG. 3, lubricant is injected in the cavity C from the source of lubricant 32 via the inlet C1 of the cavity C. After lubricating the gears and other components inside the cavity C, the lubricant falls by gravity toward a bottom B of the cavity C and is suctioned out of the cavity C via the outlet C2, and the suctioned lubricant is directed to the scavenge pump 36. The lubricant might be reinjected in the cavity C.

Referring back to FIGS. 2 and 3, to prevent lubricant that leaks out of the cavity C from being lost or from being expelled in the environment E outside the cavity C, a drain conduit 40 is provided. The drain conduit 40 has a drain inlet 40a and a drain outlet 40b. In the depicted embodiment, the drain inlet 40a is in communication with the outlet C2 of the cavity C. In the embodiment shown, the drain inlet 40a is in fluid communication with the seal 30 via the environment E. In other words, the drain conduit 40 is in fluid communication with the cavity C via the seal 30. In the embodiment shown, the drain inlet 40a is located in close proximity to an environment face of the seal 30, at a relative lower vertical location so that lubricant might flow naturally toward the drain conduit 40 by gravity.

Hence, as seen in FIG. 2, the drain inlet 40a is located at a lower elevation than the seal 30 so that lubricant flows naturally by gravity toward the drain conduit 40 as indicated by arrow F1. In the depicted embodiment, a baffle 42 is secured to the pad 20e of the housing 20c of the gearbox 20. The baffle 42 extends from the pad 20e radially toward the axis A of the output shaft 20d of the gearbox. The baffle 42 may be a deflector, an oil guide, etc.

As shown in FIG. 2, the drain conduit 40 extends through an aperture 20g defined through the pad 20e of the gearbox housing 20c. The aperture 20g is located axially between the baffle 42 and the seal 30. In such a case, the baffle 42 may help in guiding the lubricant that leaks from the seal 30 toward the drain conduit 40. As another embodiment, the conduit 40 may have a first tubing section from the seal 30 to the aperture 20g, and a second tubing section from the aperture 20g inside the cavity C to location C2.

The drain conduit 40 may extend entirely within the cavity C of the gearbox 20. Alternatively, the drain conduit 40 may be partially located outside the cavity C and re-enter the cavity C from a bottom of the housing 20c of the gearbox 20. The drain conduit 40 may be a pipe of suitable material extending inside or at least partially outside the cavity C. The drain conduit 40 may be co-forged with the housing 20c such that the housing 20c defines the drain conduit 40.

The drain outlet 40b is fluidly connected to the outlet C2 of the cavity C. The drain outlet 40b of the drain conduit 40 is located within the bearing cavity C and within a lower pressure zone Z inside the cavity C. The lower pressure zone Z is illustrated in tiered line in FIG. 3. In use, a pressure within the lower pressure zone Z of the cavity C may be occasionally less than that outside the lower pressure zone Z or that within a remainder of the cavity C. This lower pressure zone Z is created by the scavenge pump 36 that suctions the lubricant out of the cavity C. In other words, the scavenge pump 36 in use decreases a pressure within the scavenge conduit 44 that induces a flow of lubricant F2 from the outlet C2 of the cavity C toward the scavenge pump 36.

The lower pressure zone Z is within a vicinity of the outlet C2 of the cavity C. A size of the lower pressure zone Z depends on the scavenge pump 36; the more powerful the scavenge pump 36 is, the bigger will be the lower pressure zone Z. In other words, the lower pressure zone Z is a local zone within the cavity C in which the scavenge pump 36 has an influence on the lubricant contained within that zone Z.

By having the outlet 40b of the drain conduit 40 in proximity to the outlet C2 of the cavity C, a flow of lubricant within the drain conduit 40 is created, or induced, by the scavenge pump 36. The flow F2 of lubricant from the cavity C entrains a flow of lubricant within the drain conduit 40. In other words, a jet pump effect is created by the flow of lubricant from the cavity C toward the scavenge pump 36 that draws the lubricant contained within the drain conduit 40. The motive flow of the jet pump thereby created corresponds to the flow F2 of lubricant from the cavity C to the scavenge pump 36 and the entrained flow corresponds to the flow of lubricant within the drain conduit 40.

In the depicted embodiment, a cross-sectional area of the drain conduit 40 is less than that of the outlet C2 of the cavity C. The outlet 40b of the drain conduit 40 may be located downstream of the outlet C2 of the cavity C relative to the flow of lubricant F2 within the scavenge conduit 44. As shown in FIG. 3, both of the drain conduit outlet 40b and the outlet C2 of the cavity are located at the bottom B of the housing such that lubricant within the cavity C flows naturally by gravity toward both of the drain outlet 40b and the outlet C2 of the cavity C.

In some cases, a pressure regulating valve 40c is fluidly connected to the drain conduit 40 between the drain inlet 40a and the drain outlet 40b. The pressure regulating valve 40c may be used to ensure that lubricant does not flow out of the cavity C via the drain conduit 40 because of the pressure differential between the cavity C and the environment E outside the cavity. The pressure regulating valve 40c may be a check valve, in one embodiment. Alternatively or in combination, a length and/or a cross-sectional area of the drain conduit 40 may be selected such that a pressure drop within the drain conduit 40 is greater than a pressure differential between the cavity C and the environment E outside the cavity C.

For scavenging lubricant, a pressure differential between a cavity and an environment outside thereof is maintained with a seal; lubricant that leaks out of the cavity via the seal is received in a drain conduit; and the received leaked lubricant is entrained back into the cavity by suctioning lubricant out of the cavity. In the disclosed embodiment, receiving the lubricant that leaks out of the cavity includes delivering the received leaked lubricant inside the cavity at a location proximate an outlet of the cavity.

Embodiments Disclosed Herein Include:

A. An assembly for a gas turbine engine comprising: static and rotating components; a seal between the static and rotating components, and between a cavity and an environment outside thereof, the cavity having an inlet fluidly connectable to a source of lubricant and an outlet fluidly connectable to a scavenge pump for drawing lubricant out of the cavity; and a drain conduit having a drain inlet outside the cavity in proximity to the seal for receiving leaked lubricant, and a drain outlet fluidly connected to the outlet of the cavity, the drain outlet located in proximity to a scavenge inlet via which the lubricant exits the cavity to flow toward the scavenge pump such that, in use, a lubricant flow within the drain conduit is entrained by the lubricant exiting the cavity via the scavenge inlet.

B. A gearbox comprising a housing and an output shaft rotatable relative to the housing, the housing defining a cavity therein, a seal between the housing of the gearbox and the output shaft, and between the cavity and an environment outside the cavity, the cavity having an inlet fluidly connectable to a source of lubricant and an outlet fluidly connectable to a scavenge pump for drawing lubricant out of the cavity, a drain conduit having a drain inlet outside the cavity in proximity to the seal for receiving leaked lubricant, and a drain outlet fluidly connected to the outlet of the cavity, the drain outlet located in proximity to a scavenge inlet via which the lubricant exits the cavity to flow toward the scavenge pump, such that, in use, a lubricant flow within the drain conduit is entrained by the lubricant exiting the cavity via the scavenge inlet.

Embodiments A and B may include any of the following elements, in any combinations:

Element 1: the drain conduit extends entirely within the cavity. Element 2: a cross-sectional area of the drain conduit is less than that of the outlet of the cavity. Element 3: the drain outlet is downstream of the outlet of the cavity relative to a lubricant flow through the outlet of the cavity. Element 4: the outlet is located at a bottom of the cavity such that the lubricant flows toward the outlet by gravity. Element 5: the drain conduit is a pipe located within the cavity. Element 6: the static component is a housing of a gearbox and wherein the rotating component is an output shaft of the gearbox, the housing defining a pad circumferentially extending about a rotation axis of the output shaft, the drain inlet fluidly connected to an aperture defined through the pad. Element 7: the aperture is located at a lower section of the pad such that the lubricant flows toward the aperture by gravity. Element 8: a baffle secured to the pad and extending from the pad toward the rotation axis, the aperture being located axially between the seal and the baffle relative to the rotation axis. Element 9: a pressure regulating valve fluidly connected to the drain conduit between the drain inlet and the drain outlet. Element 10: a length and/or a cross-sectional area of the drain conduit are selected such that a pressure drop within the drain conduit is greater than a pressure difference between a cavity pressure of the cavity and a pressure of the environment outside the cavity.

It is understood that although the configuration has been described in use with a gearbox, the same concept may be used for a bearing cavity or any other cavity that contains lubricant and that uses a seal to prevent leakage of the lubricant to the environment outside the cavity.

The above description is meant to be exemplary only, and one skilled in the art will recognize that changes may be made to the embodiments described without departing from the scope of the invention disclosed. Still other modifications which fall within the scope of the present invention will be apparent to those skilled in the art, in light of a review of this disclosure, and such modifications are intended to fall within the appended claims.

The invention claimed is:

1. An assembly for a gas turbine engine comprising: static and rotating components; a seal between the static and rotating components, and between a cavity and an environment outside thereof, the cavity having an inlet fluidly connectable to a source of lubricant and an outlet fluidly connectable to a scavenge pump for drawing lubricant out of the cavity; and a drain conduit having a drain inlet outside the cavity in proximity to the seal for receiving leaked lubricant, and a drain outlet fluidly connected to the outlet of the cavity, the drain outlet located in proximity to a scavenge inlet via which the lubricant exits the cavity to flow toward the scavenge pump such that, in use, a lubricant flow within the drain conduit is entrained by the lubricant exiting the cavity via the scavenge inlet.

2. The assembly of claim 1, wherein the drain conduit extends entirely within the cavity.

3. The assembly of claim 1, wherein a cross-sectional area of the drain conduit is less than that of the outlet of the cavity.

4. The assembly of claim 1, wherein the drain outlet is downstream of the outlet of the cavity relative to a lubricant flow through the outlet of the cavity.

5. The assembly of claim 1, wherein the outlet is located at a bottom of the cavity such that the lubricant flows toward the outlet by gravity.

6. The assembly of claim 1, wherein the drain conduit is a pipe located within the cavity.

7. The assembly of claim 1, wherein the static component is a housing of a gearbox and wherein the rotating component is an output shaft of the gearbox, the housing defining a pad circumferentially extending about a rotation axis of the output shaft, the drain inlet fluidly connected to an aperture defined through the pad.

8. The assembly of claim 7, wherein the aperture is located at a lower section of the pad such that the lubricant flows toward the aperture by gravity.

9. The assembly of claim 7, further comprising a baffle secured to the pad and extending from the pad toward the rotation axis, the aperture being located axially between the seal and the baffle relative to the rotation axis.

10. The assembly of claim 1, further comprising a pressure regulating valve fluidly connected to the drain conduit between the drain inlet and the drain outlet.

11. The assembly of claim 1, wherein a length and/or a cross-sectional area of the drain conduit are selected such that a pressure drop within the drain conduit is greater than a pressure difference between a cavity pressure of the cavity and a pressure of the environment outside the cavity.

12. A gearbox comprising a housing and an output shaft rotatable relative to the housing, the housing defining a cavity therein, a seal between the housing of the gearbox and the output shaft, and between the cavity and an environment outside the cavity, the cavity having an inlet fluidly connectable to a source of lubricant and an outlet fluidly connectable to a scavenge pump for drawing lubricant out of the cavity, a drain conduit having a drain inlet outside the cavity in proximity to the seal for receiving leaked lubricant, and a drain outlet fluidly connected to the outlet of the cavity, the drain outlet located in proximity to a scavenge inlet via which the lubricant exits the cavity to flow toward the scavenge pump, such that, in use, a lubricant flow within the drain conduit is entrained by the lubricant exiting the cavity via the scavenge inlet.

13. The gearbox of claim 12, wherein a cross-sectional area of the drain conduit is less than that of the outlet of the cavity.

14. The gearbox of claim 12, wherein the drain outlet is downstream of the outlet of the cavity relative to a lubricant flow through the outlet of the cavity.

15. The gearbox of claim 12, wherein the outlet is located at a bottom of the cavity such that the lubricant flows toward the outlet by gravity.

16. The gearbox of claim 12, wherein the housing defines a pad circumferentially extending about a rotation axis of the output shaft, the drain inlet fluidly connected to an aperture defined through the pad.

17. The gearbox of claim 12, further comprising a pressure regulating valve fluidly connected to the drain conduit between the drain inlet and the drain outlet.

18. The gearbox of claim 12, wherein a length and/or a cross-sectional area of the drain conduit are selected such that a pressure drop within the drain conduit is greater than a pressure difference between a cavity pressure of the cavity and a pressure of the environment outside the cavity.

\* \* \* \* \*